United States Patent
Ebara et al.

[11] Patent Number: 5,969,224
[45] Date of Patent: *Oct. 19, 1999

[54] SPEEDOMETER FOR VEHICLE

[75] Inventors: Katsumi Ebara; Masahiro Kawamata, both of Saitama, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/825,185

[22] Filed: Mar. 27, 1997

[30] Foreign Application Priority Data

Mar. 29, 1996 [JP] Japan .................................. 8-076017

[51] Int. Cl.$^6$ ...................................................... G01P 1/07
[52] U.S. Cl. ............................ 73/1.37; 73/488; 116/62.1; 116/62.2; 116/62.3; 324/160; 340/441; 340/936
[58] Field of Search ..................................... 73/1.37, 1.41, 73/488, 489, 490, 491, 493, 499; 74/12; 116/62.1, 62.2, 62.3, 62.4; 324/160, 163, 167; 340/432, 438, 441, 466, 670, 671, 936

[56] References Cited

FOREIGN PATENT DOCUMENTS 62-57165  4/1987  Japan .

*Primary Examiner*—Richard Chilcot
*Assistant Examiner*—Eric S. McCall
*Attorney, Agent, or Firm*—Birch, Stewart, Kolasch & Birch, LLP.

[57] ABSTRACT

An object of the present invention is to provide a speedometer capable of distinctly indicating traveling speeds in a range of traveling speeds at which a vehicle travels in most of the time. A speedometer has a scale plate provided with a main speed scale of a substantially semicircular shape. The overall scale range of the main speed scale is divided by division points into four equal sections, and scale marks 5, 10, 15 and 45 mph are marked on the main speed scale at the division points, respectively. A low-speed range, i.e., a working speed range, of 0 to 15 mph extends in ¾ of the overall scale range and the working speed range is graduated in quinary divisions of 5 mph. Therefore, speed indications in the low-speed range can accurately be read with an increase number of digits.

18 Claims, 6 Drawing Sheets

SPEEDOMETER FOR VEHICLE

BACKGROUND OF THE INVENTION

1. Field of the Invention

The present invention relates to a speedometer for a vehicle which is provided with a scale plate suitable for practical uses.

2. Description of Background Art

A speedometer disclosed in JP-U No. 62-57165 is provided with a scale plate having an overall scale range divided into a first half scale range used as a low-speed scale range for indicating speeds in the range of 0 to 30 km/hr and a second half scale range used as a high-speed scale range for indicating speeds in the range of 30 to 90 km/hr. The second half scale range is graduated in divisions different from those in which the first half scale range is graduated.

If the scale ranges are graduated in different divisions in such a manner, the divisions in the low-speed scale range, which is often used during a practical operation of a vehicle, are greater than those in the high-speed scale range and the graduations of the low-speed range are easy to read.

SUMMARY AND OBJECTIONS OF THE INVENTION

Even if the scale plate is graduated like the scale plate of the above prior art speedometer, a scale range for very low working speeds, i.e., practical speeds for an ATV or the like, such as a speed range of 0 to 15 mph, is less than half the overall scale range in which an indicator moves and the graduations are difficult to read. An ATV is a self-propelled two-wheel or four-wheel drive saddle-seat vehicle provided with front and rear balloon tires and intended principally for low-speed farm work.

More particularly, an ATV travels, in most cases, at traveling speeds around 5 mph. If the ATV is used for sowing seeds at a first or low traveling speed in the foregoing range, the first traveling speed of the ATV must be regulated at an accuracy of 0.5 mph to sow seeds at accurate intervals.

Sometimes, the ATV travels at a second or working speed of about 10 mph or travels at a third or relatively high traveling speed of 15 mph or above when moving from one working place to another. It has been difficult to accurately know an actual traveling speed of the ATV from the prior art speedometer when the traveling speed is in the high-speed range.

There has been a demand for a speedometer capable of distinctly indicating speeds in a low speed range and for accurately indicating speeds in a relatively high speed range.

The present invention solves the foregoing problems by providing a speedometer for a vehicle, provided with a scale plate having a high-speed scale range and a low-speed scale range graduated in divisions greater than those in which the high-speed scale range is graduated. The low-speed scale range is greater than half an overall scale range in which an indicator moves.

In this speedometer for a vehicle, the low-speed scale range may be about ¾ of the overall scale range in which the indicator moves.

This speedometer for a vehicle, may be incorporated into an ATV, and the low-speed scale range may be graduated in quinary divisions of 5 mph.

In this speedometer for a vehicle, scale markings for the quinary graduations in divisions of 5 mph may correspond to ¼, 2/4 and ¾ of the overall scale range, respectively.

If the low-speed scale range, graduated in divisions greater than those in which the high-speed scale range, is graduated and is greater than half the overall scale range, the divisions indicated by the scale marks in the low-speed scale range are wide enough to enable accurate reading of speed indications with many digits in the low-speed scale range.

If the low-speed scale range is about ¾ of the overall scale range, speed indications with a sufficiently large number of digits in the low-speed scale range can accurately be read.

If the speedometer is incorporated into an ATV and the scale is graduated in quinary graduations of divisions of 5 mph, speeds can be read in an accuracy of 0.5 mph, which is suitable for an ATV which travels at low speeds in the low-speed scale range for most operations and is required to travel accurately at a traveling speed specified for the operation.

If scale markings for the quinary graduations in divisions of 5 mph correspond to ¼, 2/4 and ¾ of the overall scale range, respectively, scale markings of 5 mph, 10 mph and 15 mph can be marked at positions corresponding to ¼, 2/4 and ¾ of the overall scale range, respectively.

If a position corresponding to ¼ of the overall scale range is assigned to a scale marking of a high speed, such as 45 mph, speeds in the low-speed range can accurately be read, and necessary high speeds in the high-speed range can accurately be read, which is suitable to the practical operation of the ATV.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 2:
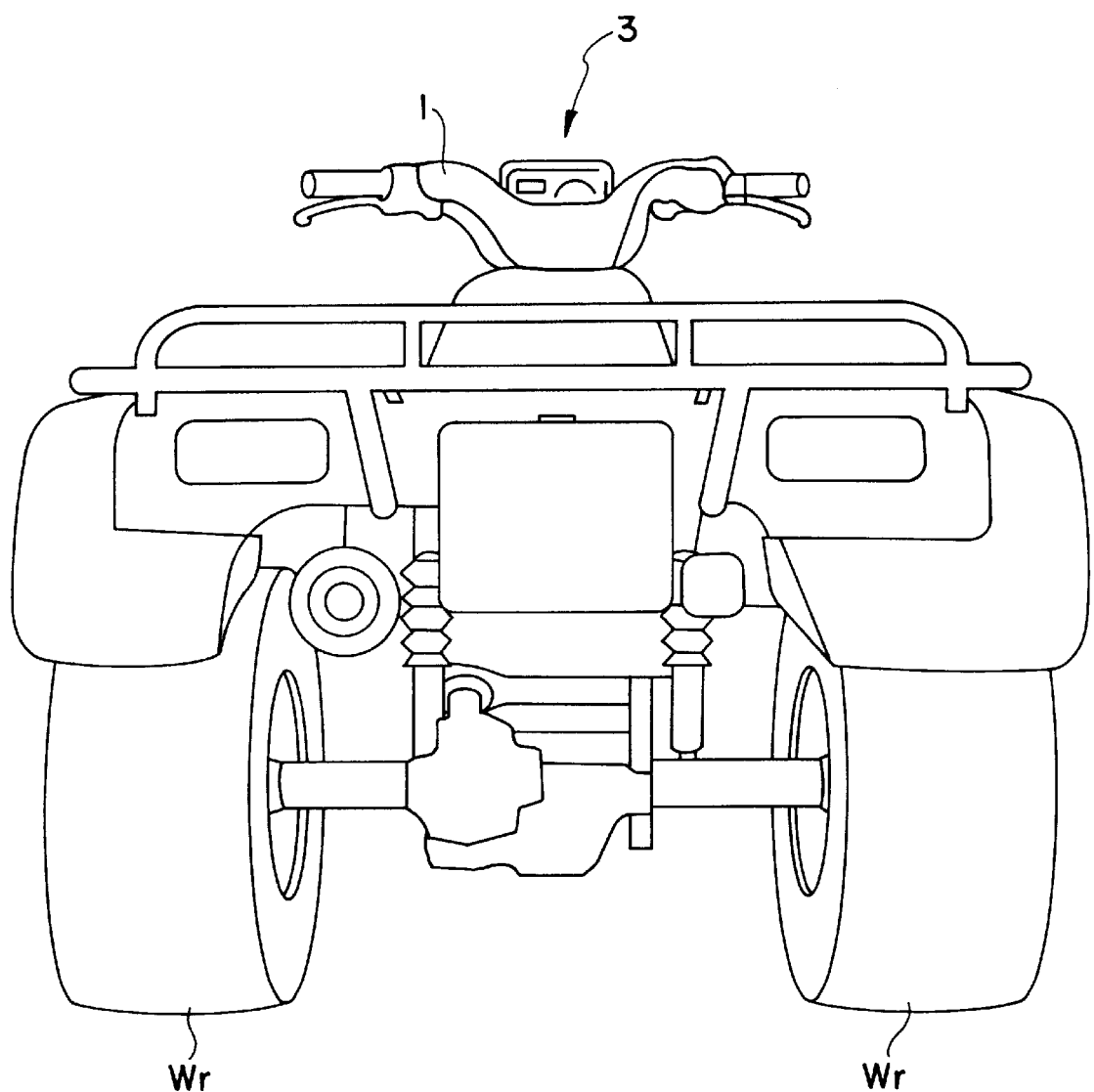
FIG. 2 is a rear view of an ATV provided with the speedometer.
Figure 3:
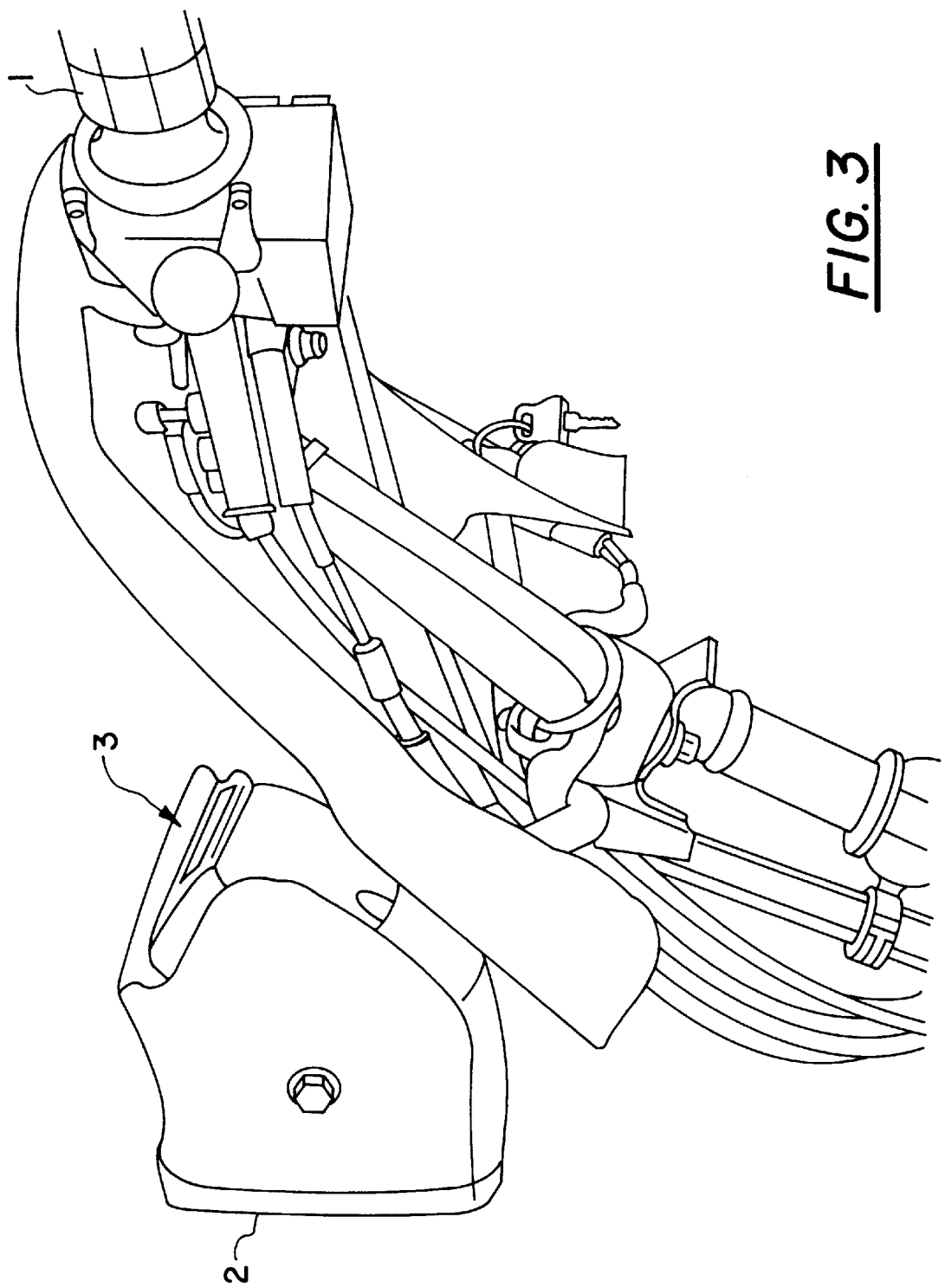
FIG. 3 is an enlarged side view of a portion including the speedometer of the ATV.

Referring to FIGS. 2 and 3, an ATV provided with a speedometer in a preferred embodiment according to the present invention is a two-wheel or four-wheel drive saddle seat vehicle provided with front wheels, not shown, and rear wheels Wr. The front and the rear wheels are low-pressure balloon tires. A combination meter 3 is attached to the rear end of a headlight 2 disposed at a position corresponding to the middle of a steering bar 1.

Figure 1:
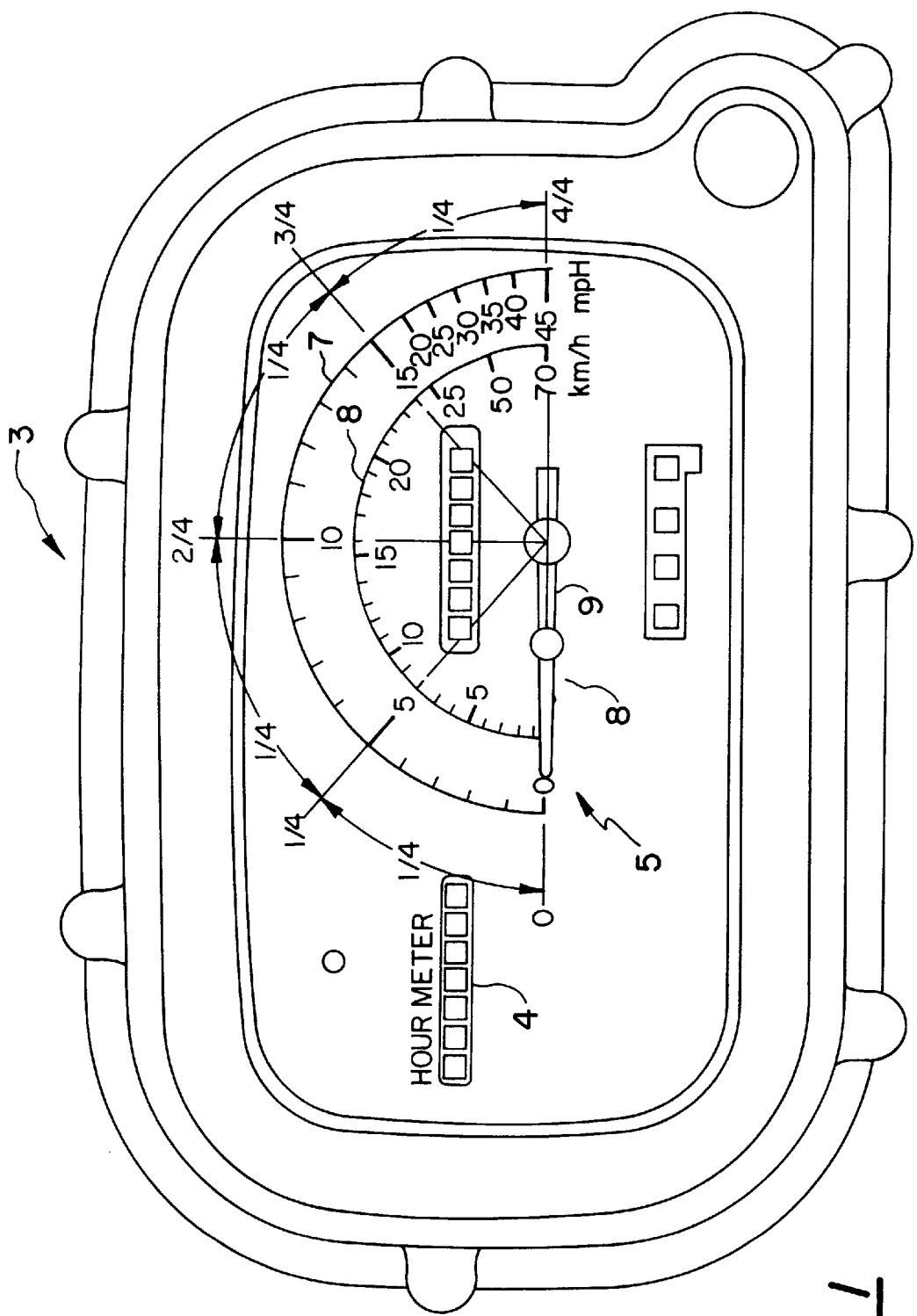
FIG. 1 is a plan view of a speedometer in a preferred embodiment according to the present invention.

As shown in FIG. 1, the combination meter 3 has, in combination, an hour meter 4 and a speedometer 5. The speedometer has a substantially semicircular main speed scale 7 marked on a scale plate 6 and graduated in mph, and a substantially semicircular auxiliary speed scale 8 marked on the scale plate 6 and graduated in kph (kilometers per hour).

An indicator needle 9 turns through an angle corresponding to a speed on these speed scales 7 and 8 to indicate the speed on the speed scales 7 and 8. The angle of the overall scale range of the speed scales 7 and 8 corresponds to a speed range of 0 to a maximum speed at about 180°.

The overall scale range of the main speed scale 7 is divided into four sections at intervals of about 45°, and a 5 mph scale mark, a 10 mph scale mark, a 15 mph scale mark and a 45 mph scale mark are marked at angular positions corresponding to ¼, ²⁄₄, ¾ and ⁴⁄₄ of the overall scale range, respectively.

Thus, about ¾ of the overall scale range is used as a low-speed scale range for indicating speeds in the range of 0 to 15 mph, which are speeds at which the ATV travels for most kinds of work.

In the low-speed scale range, intervals between the scale marks are graduated in five divisions and auxiliary mph marks are marked at dividing positions.

The scale range between positions corresponding to ¾ and ⁴⁄₄ of the overall scale range is used for indicating speeds in the range of 15 to 45 mph at which the ATV travels when moving from one working place to another.

A section of the auxiliary speed scale 8 corresponding to 0 to about ¾ of the overall scale range is graduated in divisions of 5 kph, and a section of the same corresponding to ¾ to ⁴⁄₄ of the overall scale range is used for indicating speeds in the range of 25 to 70 kph.

The angle-to-speed ratio, i.e., the ratio of an angle through which the indicator needle 9 turns for a unit change of speed, in the low-speed scale range up to 15 mph and the angle-to-speed ratio in the high-speed scale range above 15 mph are different from each other.

Figure 4:
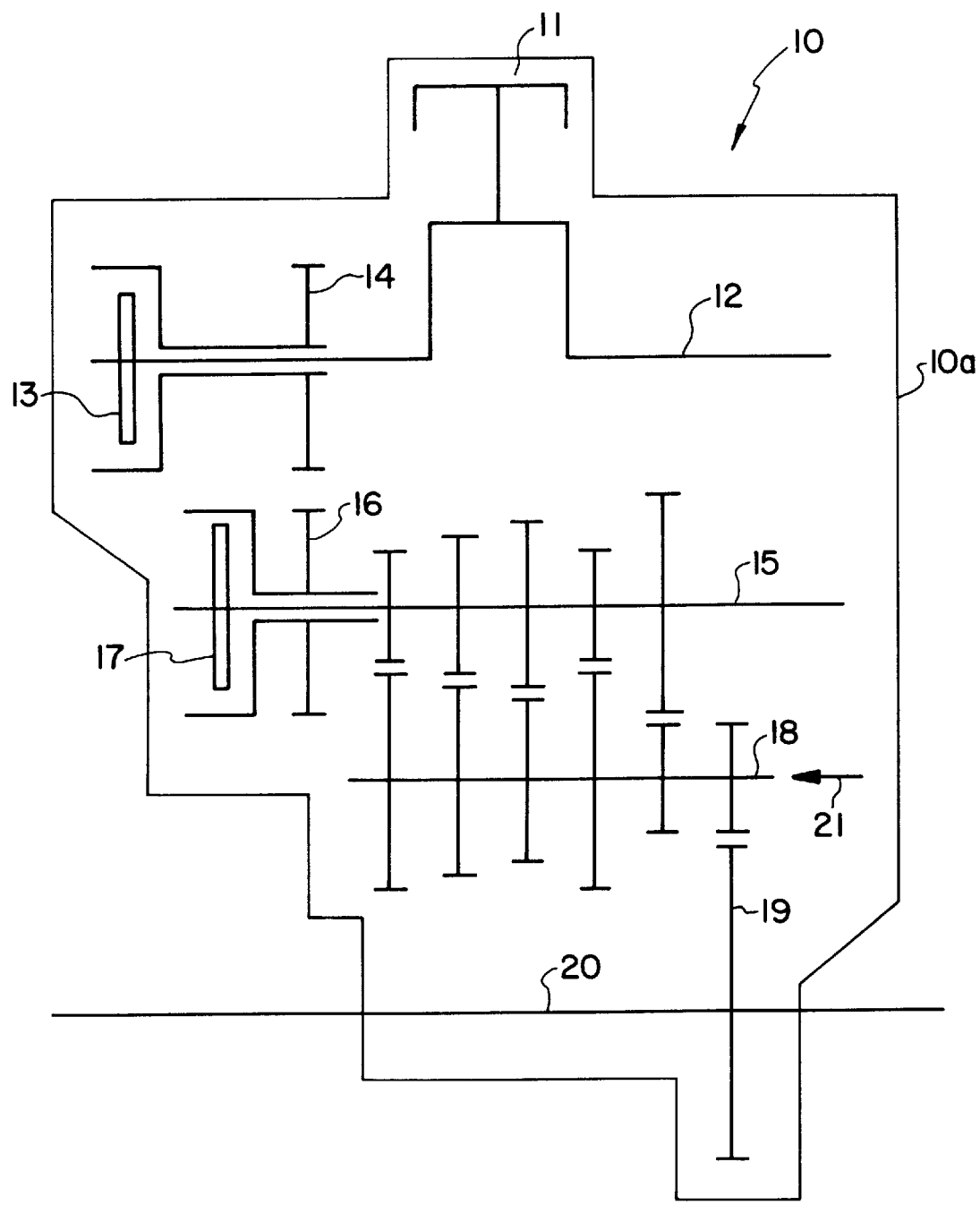
FIG. 4 is a diagrammatic view of a power unit.

Referring to FIG. 4 showing a power unit 10, the rotation of the crankshaft 12 of an engine 11 is transmitted through a centrifugal clutch 13 and a primary gear 14 to a secondary gear 16 mounted on the main shaft 15 of a transmission 10a.

The rotation of the secondary gear 16 is transmitted through a manual clutch 17 and a gear train mounted on the main shaft 15 to a gear train mounted on a countershaft 18. The rotation of the countershaft 18 is transmitted through a speed reducing gear 19 to an output shaft 20, which drives the front and the rear wheels through a shaft drive mechanism.

A rotating speed sensor 21 is associated with the countershaft 18 to measure the rotating speed of the countershaft 18.

Figure 5:
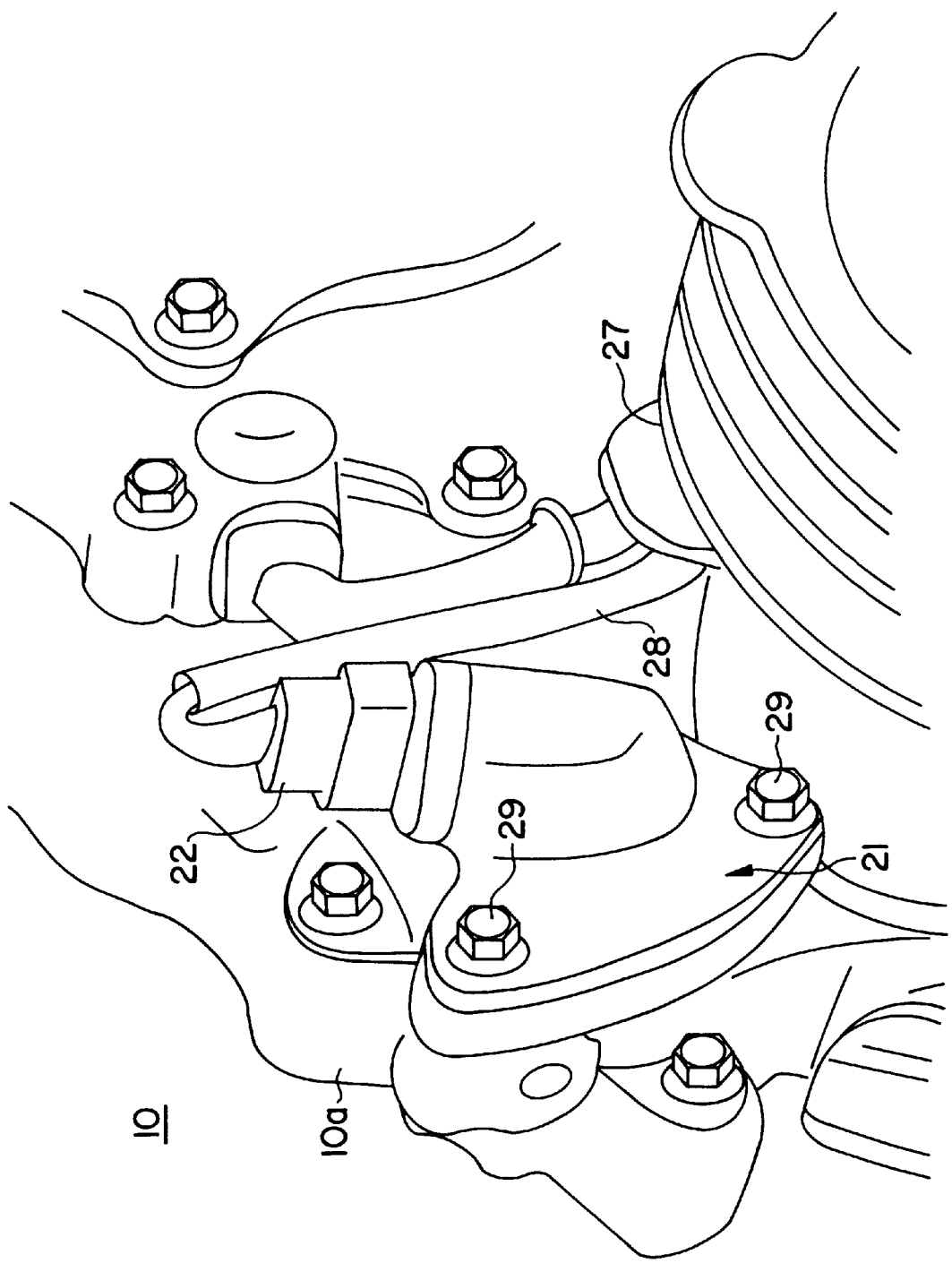
FIG. 5 is an enlarged perspective view of a portion of the power unit to which a rotating speed sensor is attached.
Figure 6:
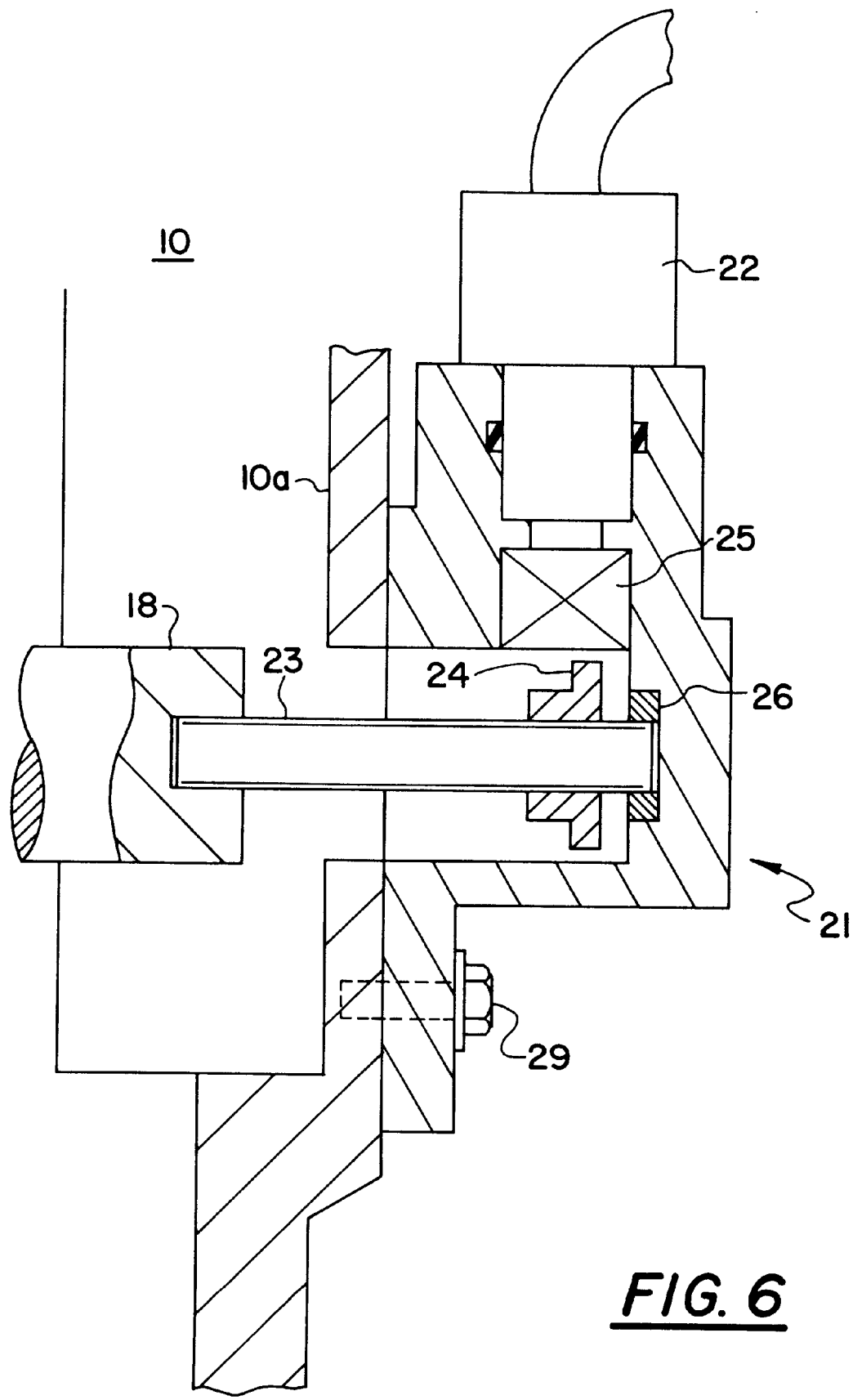
FIG. 6 is a sectional view of the portion shown in FIG. 5.

As best shown in FIGS. 5 and 6, the rotating speed sensor 21 is formed in an unit and is attached to a side wall of the transmission 10a so as to receive an end portion of the countershaft 18. The rotating speed sensor 21 provides an electric signal corresponding to a rotating speed of the countershaft 18 and gives the electric signal through a coupler 22 to the speedometer 5 of the combination meter 3.

As shown in FIG. 6, the rotating speed sensor 21 has a shaft 23 connected to an end of the countershaft 18. Projections 24 radially projecting from the shaft 23. A Hall element 25 is disposed close to the projections 24. The rotating speed sensor 21 generates a pulse every time the projection 24 passes by the Hall element 25.

A generally known pulse generator provided with a pickup coil may be employed instead of the rotating speed sensor 21 provided with the Hall element 25. As shown in FIGS. 5 and 6, a bushing 26, an ACG cover 27, an ACG cable 28, and bolts 29 are fastened to the rotating speed sensor 21 to the side surface of the transmission 10a.

The operation of the embodiment will be described hereinafter. As shown in FIG. 1, the main speed scale 7 is graduated in mph in quinary divisions of 5 mph, and the scale marks 0, 5, 10 and 15 mph are marked at positions corresponding to 0, ¼, ²⁄₄ and ¾ of the overall scale range.

When farm work, such as the sowing of seeds, requires a first traveling speed of about 5 mph, indications on the main speed scale 7 can be read to an accuracy of about 0.5 mph because the auxiliary scale marks, i.e., 1 mph scale marks are marked at wide intervals, so that the traveling speed can be regulated for accurate work.

Since scale marks 10 mph and 15 mph are marked at positions corresponding to ²⁄₄ and ¾ of the overall scale range, respectively, second traveling speeds up to 15 mph in a working speed range can be indicated at sufficiently wide intervals.

A boundary traveling speed between the working speed range and a transfer speed range, i.e., a range of speeds at which the ATV travels from one working place to another, is 15 mph, and speeds higher than 15 mph, i.e., speeds between 15 mph and 45 mph, are marked in the range between positions respectively corresponding to ¾ and ⁴⁄₄ of the overall scale range. Therefore, third or high traveling speeds in the transfer speed range can be read satisfactorily and accurately.

The working speed range need not necessarily be from 0 to ¾ of the overall scale range and may be a range from 0 to a position beyond a position corresponding to ²⁄₄ of the overall scale range. In this case, the transfer speed range can be expanded.

The present invention is applicable to vehicles other than ATVs, and is suitably applicable to vehicles which travel in most cases at low traveling speeds.

The speed scale need not necessarily be graduated in mph and may be graduated in kph. The unit of graduation of the speed scale may be determined according to the desired purpose.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A speedometer for a vehicle comprising:
 a scale plate extending an overall predetermined distance from a low-speed scale range including a first traveling speed and a second traveling speed to a high-speed scale range including a third traveling speed;
 an indicator operatively mounted for moving relative to said scale plate for indicating a speed of a vehicle;
 said low-speed scale being graduated by scale markings in divisions being spaced apart a greater distance relative to scale markings for graduating the high-speed scale range;
 said first traveling speed of the low-speed scale range extending from zero to a distance equal to approximately one quarter of the overall predetermined distance of the scale range from the low-speed range to the high-speed range over which said indicator moves, said second traveling speed of the low-speed scale range extending a distance from approximately the one quarter of the overall predetermined distance of the scale range from the low speed range to approximately three quarters of the overall predetermined distance of the scale range over which said indicator moves for providing an enlarged low-speed scale range corresponding to low working speeds of a vehicle, and said third traveling speed of the scale range being positioned to extend a distance from approximately the three quarters position to a four quarters position of the scale range for indicating a high-speed range, said low-speed range enabling clear visibility to permit operation of the vehicle at a speed regulated in increments of 0.5 mph (0.8 kmph) while operating the vehicle in said low-speed scale range.

2. The speedometer for a vehicle according to claim 1, wherein the speedometer is incorporated into an ATV, and the low-speed scale range is graduated in a predetermined number of quinary divisions of 5 miles per hour.

3. The speedometer for a vehicle, according to claim 2, wherein scale markings for the quinary graduations in divisions of 5 miles per hour correspond to ¼, ²⁄₄ and ¾ of the overall scale range, respectively.

4. The speedometer for a vehicle, according to claim 1, wherein one quarter of said overall predetermined distance from the scale range from the low-speed scale range to the high-speed scale range is divided into scale markings representing 5 miles per hour to permit an operator of a vehicle to accurately maintain a low speed for a vehicle.

5. The speedometer for a vehicle, according to claim 1, wherein two quarters of said overall predetermined distance from the scale range from the low-speed scale range to the high-speed scale range is divided into scale markings representing 10 miles per hour to permit an operator of a vehicle to accurately maintain a low speed for a vehicle.

6. The speedometer for a vehicle, according to claim 1, wherein three quarters of said overall predetermined distance from the scale range from the low-speed scale range to the high-speed scale range is divided into scale markings representing 15 miles per hour to permit an operator of a vehicle to accurately maintain a low speed for a vehicle.

7. The speedometer for a vehicle, according to claim 1, and further including a second scale being arranged in a juxtaposed position relative to said low-speed scale and said high-speed scale for reading the speed of a vehicle in another unit of measurement per hour.

8. The speedometer for a vehicle, according to claim 1, and further including a rotating speed sensor for determining the speed of a vehicle and transmitting said speed to said indicator for displaying the speed on the scale plate.

9. The speedometer for a vehicle, according to claim 8, wherein said rotating speed sensor includes a shaft connected to an end of a countershaft of a power supply for a vehicle, projections extending from said shaft and a Hall element for detecting said projections with the rotation of said shaft.

10. A speedometer for a vehicle comprising:
   a speed display extending an overall predetermined distance from a low-speed scale range including a first traveling speed and a second traveling speed to a high-speed scale range including a third traveling speed;
   an indicator operatively mounted for moving relative to said speed display for indicating a speed of a vehicle;
   low-speed scale markings on said low-speed scale range being graduated and being spaced apart a greater distance relative to high-speed scale markings for graduating the high-speed scale range;
   said first traveling speed of the low-speed scale range extending from zero to a distance equal to approximately one quarter of the overall predetermined distance of the scale range from the low-speed scale range to the high-speed scale range over which said indicator moves, said second traveling speed of the low-speed scale range extending a distance from approximately the one quarter of the overall Predetermined distance of the scale range from the low speed range to approximately three quarters of the overall predetermined distance of the scale range over which said indicator moves for providing an enlarged low-speed scale range corresponding to low working speeds of a vehicle, and said third traveling speed of the scale range being positioned to extend a distance from approximately the three quarters position to a four quarters position of the scale range for indicating a high-speed range, said low-speed range enabling clear visibility to permit operation of the vehicle at a speed regulated in increments of 0.5 mph (0.8 kmph) while operating the vehicle in said low-speed scale range.

11. The speedometer for a vehicle according to claim 10, wherein the speedometer is incorporated into an ATV, and the low-speed scale range is graduated in a predetermined number of quinary divisions of 5 miles per hour.

12. The speedometer for a vehicle, according to claim 11, wherein scale markings for the quinary graduations in divisions of 5 miles per hour correspond to ¼, ²⁄₄ and ¾ of the overall scale range, respectively.

13. The speedometer for a vehicle, according to claim 10, wherein one quarter of said overall predetermined distance from the scale range from the low-speed scale range to the high-speed scale range is divided into scale markings representing 5 miles per hour to permit an operator of a vehicle to accurately maintain a low speed for a vehicle.

14. The speedometer for a vehicle, according to claim 10, wherein two quarters of said overall predetermined distance from the scale range from the low-speed scale range to the high-speed scale range is divided into scale markings representing 10 miles per hour to permit an operator of a vehicle to accurately maintain a low speed for a vehicle.

15. The speedometer for a vehicle, according to claim 10, wherein three quarters of said overall predetermined distance from the scale range from the low-speed scale range to the high-speed scale range is divided into scale markings representing 15 miles per hour to permit an operator of a vehicle to accurately maintain a low speed for a vehicle.

16. The speedometer for a vehicle, according to claim 10, and further including a second scale being arranged in a juxtaposed position relative to said low-speed scale and said high-speed scale for reading the speed of a vehicle in another unit of measurement per hour.

17. The speedometer for a vehicle, according to claim 10, and further including a rotating speed sensor for determining the speed of a vehicle and transmitting said speed to said indicator for displaying the speed on the speed display.

18. The speedometer for a vehicle, according to claim 17, wherein said rotating speed sensor includes a shaft connected to an end of a countershaft of a power supply for a vehicle, projections extending from said shaft and a Hall element for detecting said projections with the rotation of said shaft.

\* \* \* \* \*